US008971596B2

(12) United States Patent
Vestgöte

(10) Patent No.: US 8,971,596 B2
(45) Date of Patent: *Mar. 3, 2015

(54) METHOD FOR IDENTIFYING FINGERPRINTS THROUGH NUMERIC REPRESENTATION

(71) Applicant: Steria AS, Olso (NO)

(72) Inventor: Örjan Vestgöte, Målilla (SE)

(73) Assignee: Steria AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,397

(22) Filed: Aug. 19, 2014

(65) Prior Publication Data

US 2014/0355848 A1    Dec. 4, 2014

Related U.S. Application Data

(63) Continuation of application No. 12/310,703, filed as application No. PCT/SE2007/000777 on Sep. 6, 2007.

(30) Foreign Application Priority Data

Sep. 7, 2006  (SE) ...................................... 0601835

(51) Int. Cl.
  *G06K 9/00*   (2006.01)
  *G06F 17/30*  (2006.01)
  *G06K 9/46*   (2006.01)

(52) U.S. Cl.
  CPC .......... *G06K 9/00073* (2013.01); *G06F 17/301* (2013.01); *G06F 17/30386* (2013.01); *G06F 17/30412* (2013.01); *G06K 9/00093* (2013.01); *G06K 9/4604* (2013.01)
  USPC .......................................... 382/124; 382/125

(58) Field of Classification Search
  None
  See application file for complete search history.

(56) References Cited

U.S. PATENT DOCUMENTS

| 5,995,630 A | 11/1999 | Borza |
| 2003/0103658 A1 | 6/2003 | Pan et al. |

(Continued)

FOREIGN PATENT DOCUMENTS

| EP | 0731426 A2 | 9/1996 |
| EP | 0779595 A2 | 6/1997 |
| EP | 1445727 A1 | 8/2004 |
| EP | 1501040 A1 | 1/2005 |
| GB | 2402791 A | 12/2004 |

(Continued)

OTHER PUBLICATIONS

Bergstrand/CC, Jesper, "International Search Report" for PCT/SE2007/000777 as mailed Dec. 10, 2007 (3 pages).

*Primary Examiner* — Sumati Lefkowitz
*Assistant Examiner* — Jhere Rowland
(74) *Attorney, Agent, or Firm* — Winstead PC

(57) ABSTRACT

A method for searching a database comprising data related to a plurality of fingerprints. Two or more feature points in an image of an unknown fingerprint are identified. A plurality of properties are generated. The plurality of properties are based on the two or more feature points. A number comprising a plurality of digits, e.g. binary digits, is assigned to each of the plurality of properties. In a subsequent step, a numeric representation of said fingerprint is generated based on the assigned numbers. The numeric representation is generated by interleaving the plurality of digits, such that the digits of the numeric representation are arranged in an interleaved or intertwined manner within the numeric representation. The numeric representation is used as a search argument when searching the database. The invention also relates to an apparatus and computer program product.

12 Claims, 7 Drawing Sheets

(56) References Cited

U.S. PATENT DOCUMENTS

| | | |
|---|---|---|
| 2003/0156011 A1 | 8/2003 | Modl et al. |
| 2004/0096087 A1 | 5/2004 | Funahashi |
| 2005/0129291 A1 | 6/2005 | Boshra |
| 2005/0147282 A1* | 7/2005 | Fujii ............................ 382/124 |
| 2007/0041622 A1 | 2/2007 | Salva Calcagno |

FOREIGN PATENT DOCUMENTS

| | | |
|---|---|---|
| RU | 2054197 C1 | 2/1996 |
| RU | 2185661 C2 | 7/2002 |
| WO | WO-9848538 A2 | 10/1998 |
| WO | WO-0106445 A1 | 1/2001 |
| WO | WO-2004074978 A2 | 9/2004 |

* cited by examiner

400

| A | B | C | Property | Difference |
|---|---|---|---|---|
| 54 | 50 | 50 | 258360 |  |
| 54 | 50 | 51 | 258361 | 1 |
| 54 | 51 | 50 | 258362 | 1 |
| 54 | 51 | 51 | 258363 | 1 |
| 55 | 50 | 50 | 258364 | 1 |
| 55 | 50 | 51 | 258365 | 1 |
| 55 | 51 | 50 | 258366 | 1 |
| 55 | 51 | 51 | 258367 | 1 |
| 52 | 48 | 52 | 258368 | 1 |
| 52 | 48 | 53 | 258369 | 1 |
| 52 | 49 | 52 | 258370 | 1 |
| 52 | 49 | 53 | 258371 | 1 |
| 53 | 48 | 52 | 258372 | 1 |
| 53 | 48 | 53 | 258373 | 1 |
| 53 | 49 | 52 | 258374 | 1 |
| 53 | 49 | 53 | 258375 | 1 |
| 52 | 48 | 54 | 258376 | 1 |
| 52 | 48 | 55 | 258377 | 1 |
| 52 | 49 | 54 | 258378 | 1 |
| 52 | 49 | 55 | 258379 | 1 |
| 53 | 48 | 54 | 258380 | 1 |
| 53 | 48 | 55 | 258381 | 1 |
| 53 | 49 | 54 | 258382 | 1 |
| 53 | 49 | 55 | 258383 | 1 | min 52 48 50
max 55 51 55

| A | B | C | Property | Difference |
|---|---|---|----------|------------|
| 47 | 55 | 60 | 244726 | 1 |
| 47 | 55 | 61 | 244727 | 1 |
| 46 | 54 | 62 | 244728 | 1 |
| 46 | 54 | 63 | 244729 | 1 |
| 46 | 55 | 62 | 244730 | 1 |
| 46 | 55 | 63 | 244731 | 1 |
| 47 | 54 | 62 | 244732 | 1 |
| 47 | 54 | 63 | 244733 | 1 |
| 47 | 55 | 62 | 244734 | 1 |
| 47 | 55 | 63 | 244735 | 1 |
| 45 | 56 | 60 | 245572 | 837 |
| 45 | 56 | 61 | 245573 | 1 |
| 45 | 56 | 62 | 245580 | 7 |
| 45 | 56 | 63 | 245581 | 1 |
| 46 | 56 | 60 | 245600 | 19 |
| 46 | 56 | 61 | 245601 | 1 | min 45 54 60
max 47 56 63

FIG. 4B

METHOD FOR IDENTIFYING FINGERPRINTS THROUGH NUMERIC REPRESENTATION

CROSS-REFERENCE TO RELATED APPLICATIONS

This application is a continuation of U.S. patent application Ser. No. 12/310,703, filed Sep. 6, 2007. U.S. patent application Ser. No. 12/310,703 is a national stage of PCT application No. PCT/SE2007/000777, filed Sep. 6, 2007, PCT Application No. PCT/SE2007/000777 claims priority to Swedish Patent Application No. 0601835-2, filed Sep. 7, 2006. U.S. patent application Ser. No. 12/310,703, PCT/SE2007/000777, and Swedish Patent Application No. 0601835-2 are incorporated herein by reference.

TECHNICAL FIELD

The present invention relates in general to the field of fingerprint matching. More particularly, the present invention relates to a method, an apparatus, and a computer program product for searching a database comprising data related to a plurality of fingerprints.

DESCRIPTION OF RELATED ART

Prior art fingerprint identification apparatuses and methods identify a person using the fingerprint of the person as an image that is read by an image sensor or the like. The image sensor reads the fingerprint of the person to be identified, and stores an image of the read fingerprint. The image may be examined by an algorithm for identification purpose. A matching degree may be checked between the fingerprint image and a fingerprint image previously registered in a database. This may be accomplished by comparing the fingerprint image with a great number of fingerprint images stored in the database. If the matching degree is equal to or more than a threshold value, then the identity of the person is authenticated. A pattern matching method may be used to calculate the matching degree between the two fingerprint images.

In the prior art, a linear search of the entire database may be performed during the fingerprint matching. Using this approach, a full search of a database potentially involving a million or more comparisons may be required. In general, this reduces the speed in the fingerprint matching process.

There are previously known methods, such as e.g. the Henry Classification System, to classify a fingerprint into main groups depending on the structure of the fingerprint. However, it is in general difficult to make such classifications without manual intervention in a secure way.

Furthermore, a problem when trying to find an unknown fingerprint in a database of fingerprints is that fingerprints taken from the same finger at different times are almost never the same. The variation in the print may e.g. depend on, but is not limited to:

- finger plasticity, e.g. the fingerprint is not the same if the finger is pressed hard against the surface compared to the fingerprint when the finger is only slightly pressed against the surface;
- the fingerprint is distorted due to damp, dirt, moisture etc. on the surface or on the finger;
- the size of the contact area between the finger and the surface;
- the rotation angle of the finger.

Consequently, it may be advantageous to search for not only identical fingerprint patterns, but also similar or "look-a-like" patterns, when searching the database during the fingerprint matching. However, using the above-mentioned linear search approach when searching for similar or "look-a-like" patterns in the database generally reduces the speed substantially.

Hence, an improved method, apparatus and computer program product within fingerprint searching would be advantageous, allowing for increased speed when searching a database comprising data related to a plurality of fingerprints to find a match.

SUMMARY OF THE INVENTION

Accordingly, the present invention preferably seeks to mitigate, alleviate or eliminate one or more of the above-identified deficiencies in the art and disadvantages singly or in any combination.

According to a first aspect of the invention, a method for searching a database comprising data related to a plurality of fingerprints is provided. The method comprises identifying at least two feature points in an image of an unknown fingerprint; generating a plurality of properties based on the at least two feature points; assigning a number comprising a plurality of digits to each of the plurality of properties; generating a numeric representation of said fingerprint based on the assigned numbers; and using the numeric representation as a search argument when searching the database; wherein the numeric representation is generated by at least partly interleaving said plurality of digits.

The interleaving may comprise interleaving the plurality of digits such that the digits of the numeric representation are arranged in an interleaved or intertwined manner.

The assigning may comprise assigning a number comprising a plurality of bits to each of the plurality of properties.

The interleaving may comprise interleaving the most significant bits of said plurality of bits.

The interleaving may comprise interleaving all the bits of said plurality of bits.

The interleaving may comprise bitwise interleaving of the plurality of bits.

The interleaving may comprise arranging the plurality of bits in order of significance, from most significant bits to least significant bits within the numeric representation.

In an embodiment, the assigning may comprise assigning a respective binary number $a_3 a_2 a_1 a_0, b_3 b_2 b_1 b_0, c_3 c_2 c_1 c_0, d_3 d_2 d_1 d_0 \ldots N_3 N_2 N_1 N_0$ to each of the plurality of properties, and the generating may comprise generating the numeric representation by arranging the plurality of bits in the following order: $N_3 \ldots d_3 c_3 b_3 a_3 N_2 \ldots d_2 c_2 b_2 a_2 N_1 \ldots d_1 c_1 b_1 a_1 N_0 \ldots d_0 c_0 b_0 a_0$.

In another embodiment, the assigning may comprise assigning a respective binary number $a_3 a_2 a_1 a_0, b_3 b_2 b_1 b_0, c_3 c_2 c_1 c_0, d_3 d_2 d_1 d_0 \ldots N_3 N_2 N_1 N_0$ to each of the plurality of properties, and the generating may comprise generating the numeric representation by arranging the plurality of bits in the following order: $a_3 b_3 c_3 d_3 \ldots N_3 a_2 b_2 c_2 d_2 \ldots N_2 a_1 b_1 c_1 d_1 \ldots N_1 a_0 b_0 c_0 d_0 \ldots N_0$.

In still another embodiment, the assigning may comprise assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0, d_7 d_6 d_5 d_4 d_3 d_2 d_1 d_0 \ldots N_7 N_6 N_5 N_4 N_3 N_2 N_1 N_0$ to each of the plurality of properties, and the generating may comprise generating the numeric representation by arranging the plurality of bits in the following order: $N_7 \ldots d_7 c_7 b_7 a_7 N_6 \ldots d_6 c_6 b_6 a_6 N_5 \ldots d_5 c_5 b_5 a_5 N_4 \ldots d_4 c_4 b_4 a_4 N_3 \ldots d_3 c_3 b_3 a_3 N_2 \ldots d_2 c_2 b_2 a_2 N_1 \ldots d_1 c_1 b_1 a_1 N_0 \ldots d_0 c_0 b_0 a_0$.

In yet another embodiment, the assigning may comprise assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0 d_7 d_6 d_5 d_4 d_3 d_2 d_1 d_0 \ldots N_7 N_6 N_5 N_4 N_3 N_2 N_1 N_0$ to each of the plurality of properties, and the generating may comprise generating the numeric representation by arranging the plurality of bits in the following order: $a_7 b_7 c_7 d_7 \ldots N_7 a_6 b_6 c_6 d_6 \ldots N_6 a_5 b_5 c_5 d_5 \ldots N_5 a_4 b_4 c_4 d_4 \ldots N_4 a_3 b_3 c_3 d_3 \ldots N_3 a_2 b_2 c_2 d_2 \ldots N_2 a_1 b_1 c_1 d_1 \ldots N_1 a_0 b_0 c_0 d_0 \ldots N_0$.

In another embodiment, the assigning may comprise assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0 d_7 d_6 d_5 d_4 d_3 d_2 d_1 d_0 \ldots N_7 N_6 N_5 N_4 N_3 N_2 N_1 N_0$ to each of the plurality of properties, and the generating may comprise generating the numeric representation by arranging the plurality of bits in the following order: $a_7 a_6 a_5 a_4 a_3 a_2 a_1 a_0 a_7 b_7 c_7 d_7 \ldots N_7 b_6 c_6 d_6 \ldots N_6 b_5 c_5 d_5 \ldots N_5 b_4 c_4 d_4 \ldots N_4 b_3 c_3 d_3 \ldots N_3 b_2 c_2 d_2 \ldots N_2 b_1 c_1 d_1 \ldots N_1 b_0 c_0 d_0 \ldots N_0$.

The method may also comprise masking away at least some of the least significant bits of said plurality of bits.

The method may further comprise, after the step of assigning, grouping a plurality of properties into a plurality of subsets of properties. Then, the generating may comprise generating a plurality of numeric representations of said fingerprint based on said subsets of properties, wherein each of the numeric representations may be generated by at least partly interleaving said plurality of digits. Furthermore, the using may comprise using the plurality of numeric representations as search arguments when searching the database.

According to a second aspect of the invention, there is provided a computer program product comprising program instructions for causing a computer system to perform the method according to the first aspect of the invention when the program instructions are run on a computer system having computer capabilities. The computer program product may e.g. be embodied on a record medium, stored in a computer memory, embodied in a read-only memory, or carried on an electrical carrier signal.

According to a third aspect of the invention, an apparatus for searching a database comprising data related to a plurality of fingerprints, comprises: an identification unit adapted to identify at least two feature points in an image of an unknown fingerprint; a first generation unit adapted to generate a plurality of properties based on the at least two feature points; an assignment unit adapted to assign a number comprising a plurality of digits to each of the plurality of properties; a second generation unit adapted to generate a numeric representation of said fingerprint based on the assigned numbers; and a search unit adapted to use the numeric representation as a search argument when searching the database. The second generation unit is adapted to generate said numeric representation by at least partly interleaving said plurality of digits.

According to a fourth aspect of the invention, there is provided a use of the method, the apparatus or the computer program product according to any of the aspects of the invention. The use of the method, the apparatus or the computer program product may e.g. be in a crime scene investigation, a police control, an authentication equipment or a passage system at an airport, industrial park or building, etcetera.

Further embodiments of the invention are defined in the dependent claims.

BRIEF DESCRIPTION OF THE DRAWINGS

Further objects, features and advantages of the invention will appear from the following detailed description of embodiments of the invention, reference being made to the accompanying drawings, in which:

FIG. 4A is a table;

FIG. 4B is another table;

DETAILED DESCRIPTION OF EMBODIMENTS

Figure 1:
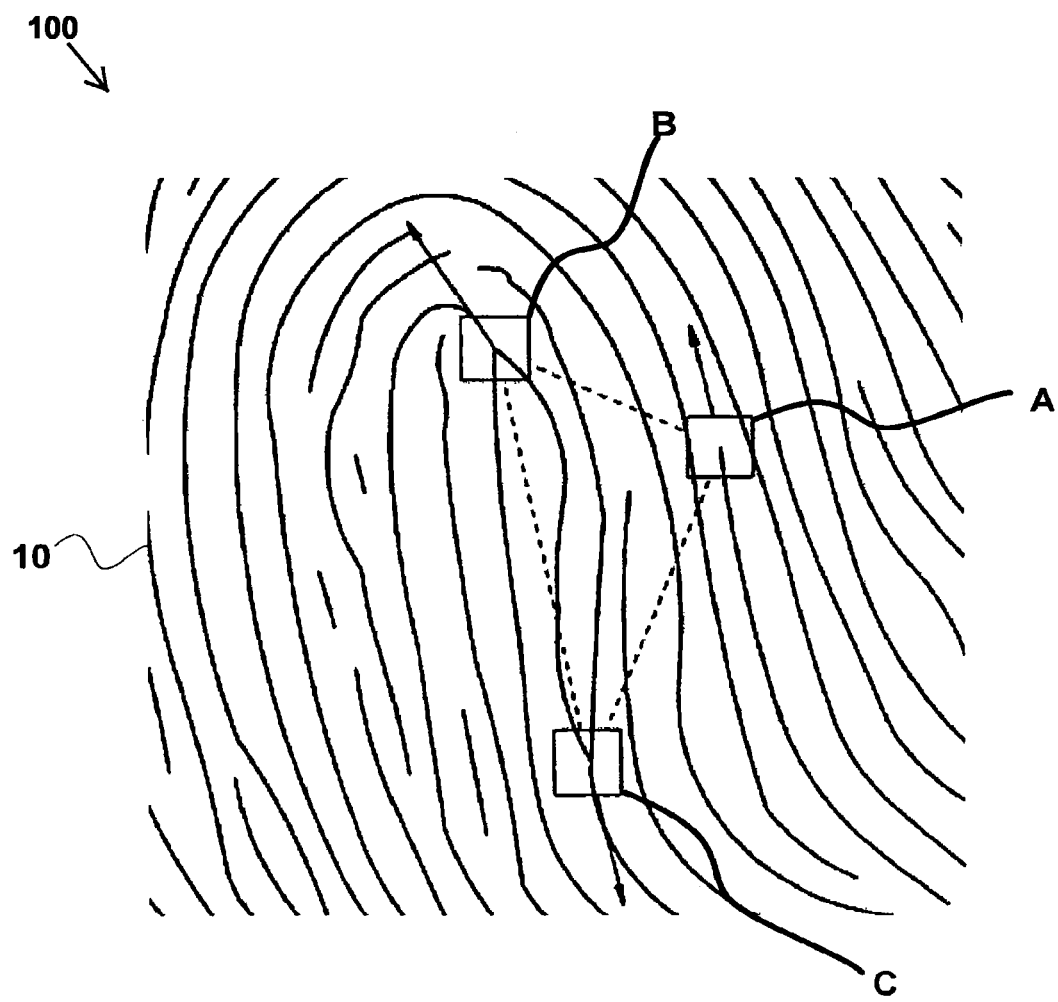
FIG. 1 is a pictorial representation of a fingerprint and the feature points therein.

The embodiments described below disclose the best mode and enables a person ordinary skilled in the art to carry out the invention. The different features of the embodiments can be combined in other manners than described below. The invention may be embodied in many different forms and should not be construed as limited to the embodiments set forth herein. Rather, these embodiments are provided so that this disclosure will be thorough and complete, and will fully convey the scope of the invention to those skilled in the art. The invention is only limited by the appended patent claims.

An embodiment of the method will be described below. The method generally comprises the following steps: identification of feature points; generation of properties; assigning a number; generation of a representation; and using the representation when searching a database. Each of the steps will be described below.

Identification of feature points involves identification of two or more feature points in an image of an unknown fingerprint.

Generation of properties involves generation of a plurality of properties based on the two or more feature points.

Assigning a number involves assigning a number comprising a plurality of digits, e.g. a plurality of binary digits (bits), to each of the plurality of properties.

Generation of a representation involves generation of a numeric representation of said fingerprint based on the assigned numbers. Said numeric representation is generated by at least partly interleaving said plurality of digits. Accordingly, the digits of the numeric representation may be arranged in an interleaved or intertwined manner within the numeric representation. Therefore, the generation of the numeric representation may be referred to as interleaved inclusion of the digits of the plurality of digits into a single numeric representation.

Using the representation when searching a database involves searching a database comprising data related to a plurality of fingerprints by using the numeric representation as search argument.

In an embodiment, the method further comprises, after the assigning, grouping a plurality of properties into a plurality of subsets of properties. In this embodiment, the generation involves generating a plurality of numeric representations of said fingerprint based on said subsets of properties. Furthermore, the using then involves using the plurality of numeric representations as search arguments when searching said database.

It has turned out by experiment that by representing said fingerprint by said numeric representation(s) it is possible to find similar-shaped or look-a-like properties in a database comprising data related to a plurality of fingerprints with improved speed when compared to prior art solutions. It has turned out that it possible to perform a search in a sorted list of said database with a speed improvement. In fact, the speed may be improved with a speed factor up to and including approximately 100 according to some embodiments of the invention.

Fingerprint

FIG. 1 illustrates a representation of a portion of a fingerprint 10, such as a human fingerprint. The fingerprint 10 is typically represented by one or more properties characterizing a collection of feature points, commonly referred to as "minutiae points", associated with the fingerprint 10. The feature points associated with the fingerprint 10 are typically derived from an image of the fingerprint 10 using e.g. image processing techniques, all of which may be implemented by embodiments of the invention. Different image processing techniques for this purpose are known in the art and may be implemented by those ordinary skilled in the art.

Figure 2:
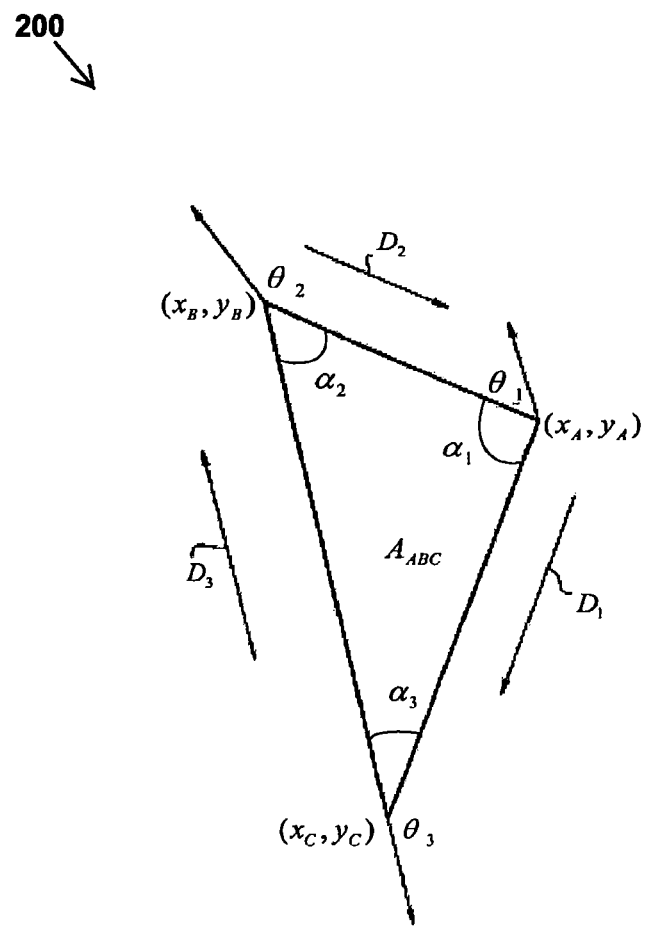
FIG. 2 is a pictorial representation of parametric data that characterize the feature points of the fingerprint in FIG. 1.

The feature points of a fingerprint 10 may be determined or derived from singularities in the ridge pattern of the fingerprint 10. As is illustrated in FIG. 1, the ridge pattern may comprise singularities such as, e.g., ridge terminations and ridge bifurcations. Point A is an example of a ridge termination, whereas points B and C are an example of a ridge bifurcation. As is illustrated in FIG. 2, each local feature point can be represented by the coordinates (x, y) of the local feature in a reference system common to all of the local feature points in the given fingerprint image.

During the fingerprint matching process, two or more feature points in the unknown fingerprint 10 are identified. A plurality of properties are then subsequently generated, based on the two or more identified feature points. Each property of the plurality of properties is in general unique for the identified feature points and may thus characterize the unknown fingerprint 10 at least in the vicinity of the identified feature points.

Property

There exist many different types of properties, i.e. biometric properties, all of which may be used or implemented by the embodiments of the present invention. Hereinbelow, some examples of properties are described so that this disclosure will be thorough and complete for those skilled in the art to carry out the embodiments of the invention. However, the examples mentioned below are not intended to limit the scope of the invention.

A property may be the distance D associated with a pair of feature points. More specifically, the distance D associated with a particular pair of feature points may represent the distance of a line drawn between two identified feature points.

A property may be the local direction $\theta$ of the ridge pattern at coordinates (x, y) of each of the identified feature points. More specifically, the local direction $\theta$ associated with a particular feature point may represent the direction of the ridge, or the image gradient at the particular feature point with respect to a line drawn from the particular feature point to another feature point. It should be understood that the gradient in a certain point (x, y) in general points in the direction where there are great changes in the pixel values in the vicinity of the point, which is typically considered to be a criterion for an edge.

A property may be the angle $\alpha$ of the ridge pattern at coordinates (x, y) of each of the identified feature points. More specifically, the angle $\alpha$ associated with a particular feature point may represent the angle between a first direction of the ridge at the particular feature point with respect to a line drawn from the particular feature point to another feature point and a second direction of the ridge at the particular feature point with respect to a line drawn from the particular feature point to still another feature point.

A property may be the ridge count RC associated with a pair of feature points. More specifically, the ridge count RC associated with a given pair of feature points may be the number of ridges crossed by a line drawn between the corresponding feature points.

A property may be the area A associated with three or more identified feature points.

As one illustrative example, some properties characterizing the fingerprint 10 in the vicinity of the identified feature points A-B-C of the unknown fingerprint 10 are shown in FIG. 2. In this example, the properties include $D_1$, $D_2$, $D_3$, $\theta_1$, $\theta_2$, $\theta_3$, $\alpha_1$, $\alpha_2$, $\alpha_3$ and A. In addition, the properties may include the ridge counts $RC_{1A-B}$, $RC_{A-C}$, $RC_{B-C}$ (not shown), where $RC_{A-B}$ represents the number of ridges crossed by a line drawn between feature points A and B, where $RC_{A-C}$ represents the number of ridges crossed by a line drawn between feature points A and C, and where $RC_{B-C}$ represents the number of ridges crossed by a line drawn between feature points B and C.

Method

Figure 3:
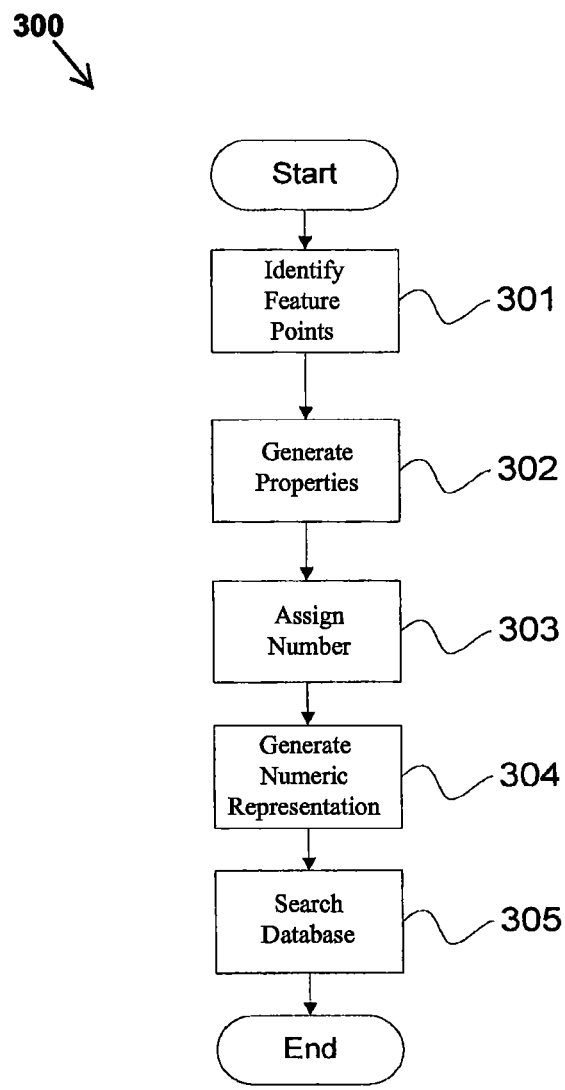
FIG. 3 is a flowchart illustrating a method according to an embodiment of the present invention.

FIG. 3 illustrates an embodiment of a method for searching a database comprising data related to a plurality of fingerprints. The database may, e.g., be a large database. A large database in general comprises several millions of records, such as e.g. ten million records or more.

In a first step, step 301, two or more feature points in an image of an unknown fingerprint 10 are identified. The two or more feature points may be derived or determined from the singularities in ridge patterns in the unknown fingerprint 10. The step 301 of identifying feature points may include extracting the feature points.

In a next step, step 302, a plurality of properties, i.e. two or more properties, are generated based on the two or more feature points that are identified in the unknown fingerprint 10 in step 301. The step 302 of generating the plurality of properties may comprise, grouping or collecting the two or more feature points into one or more subsets (e.g. triplets). Each subset may be associated with two or more feature points. For each subset, which may be selected, one or more properties that characterize the selected subset may be generated.

The one or more properties that are generated in step 302 may, e.g., be one or more of the properties described above under the section PROPERTY. That is, the one or more properties may be selected from the group comprising: a distance between two feature points; a direction of a ridge at a particular feature point with respect to a line drawn from the particular feature point to another feature point; an angle of the ridge pattern at the coordinates of a particular feature point; a number of ridges crossed by a line drawn between the two feature points; and an area associated with the at least one subset of feature points.

There exist many different implementations for performing the steps 301-303, i.e. identifying feature points and/or generating the associated properties representing the fingerprint 10, all of which may be used by the embodiments of the present invention. Different methods for identifying feature points and/or generating the associated properties are known in the art and may be implemented by those skilled in the art. Therefore, it will not be further explained herein.

It may be advantageous to limit the number of properties to be identified in step 301. To limit the amount of properties, the properties may be filtered according to certain criteria. Such criteria may e.g. be, but is not limited to, maximum and/or minimum values of the property in question. Accordingly, such criteria may e.g. be maximum and/or minimum values of the distances between the identified feature points, maximum and/or minimum values of the area covered by the lines connecting the identified feature points (if there are three or more identified feature points), etc. Various rules for reducing or limiting the number of properties by filtering using certain criteria can be implemented by the embodiments of the present invention. Yet another rule for limiting the number of properties may be to include only those properties where the difference between image gradients, or ridge directions, in the feature points, fulfill certain filter criteria.

In step 303, a number is assigned to each property of the plurality of properties. The number comprises a plurality of digits. The number may, for example, be a number comprising a plurality of binary digits (bits). The number may e.g. comprise 4 bits (i.e. a nibble), 6 bits, 8 bits (i.e. a byte), 16 bits, 24 bits, 32 bits or even more bits.

Referring now to FIG. 2, in an illustrative example four properties $D_1$, $D_2$, $\alpha_1$ and $A_{A-B-C}$ are generated from the three identified feature points A-B-C of the fingerprint 10. In step 303, these four properties may e.g. be assigned the following binary numbers of one byte each $a_7 a_6 a_5 a_4 a_3 a_2 a_1 a_0$, $b_7 b_6 b_5 b_4 b_3 b_2 b_1 b_0$, $c_7 c_6 c_5 c_4 c_3 c_2 c_1 c_0$, and $d_7 d_6 d_5 d_4 d_3 d_2 d_1 d_0$, respectively. That $D_1$ is assigned the number $a_7 a_6 a_5 a_4 a_3 a_2 a_1 a_0$, $D_2$ is assigned the number $b_7 b_6 b_5 b_4 b_3 b_2 b_1 b_0$ and so forth.

In step 304, a numeric representation of the fingerprint 10 is generated based on the assigned numbers. The numeric representation is formed by at least partly interleaving the plurality of digits of the plurality of properties. Hence, the numeric representation will represent or at least be associated with the plurality of properties. Accordingly, the numeric representation may be configured to characterize the fingerprint 10 at least in the vicinity of the identified two or more feature points. Thus, a single numeric representation can be formed in step 304, wherein at least some of the digits of the numeric representation are arranged in an interleaved or intertwined manner.

Creating or generating one single numeric representation based on the assigned numbers for the plurality of properties has, inter alia, the advantage that the derived single numeric representation will in general get more and more unique the more properties that are included into the single numeric representation. In an embodiment, the assigned numbers are formed by a plurality of bits as described hereinabove. The interleaving of the plurality of bits may comprise interleaving the plurality of bits such that the numeric representation forms a single value. The single value may be in the form of a bit stream, wherein the bits of the bit stream are arranged in an interleaved or intertwined manner. The numeric representation may e.g. be created or generated such that all of the bits, or just those bits regarded as significant bits, of the assigned numbers of the respective properties are included in the interleaved or intertwined manner into the single numeric representation.

It should be understood that the number of involved properties in the combined single numeric representation may be any number greater than 1. Furthermore, it should be understood that grouping of binary bits from each property before being interleaved into the single numeric representation may be from 1 bit up to the total length of the property (typically, but not limited to, one byte).

Referring again to FIG. 2 and the example above, various examples of the numeric representation will now be described.

According to an embodiment of the invention, the numeric representation is generated by arranging the binary digits in the following order: $d_7 c_7 b_7 a_7 d_6 c_6 b_6 a_6 d_5 c_5 b_5 a_5 d_4 c_4 b_4 a_4 d_3 c_3 b_3 a_3 d_2 c_2 b_2 a_2 d_1 c_1 b_1 a_1 d_0 c_0 b_0 a_0$.

According to another embodiment of the invention, the numeric representation is created by arranging the bits in the following order: $a_7 b_7 c_7 d_7 a_6 b_6 c_6 d_6 a_5 b_5 c_5 d_5 a_4 b_4 c_4 d_4 a_3 b_3 c_3 d_3 a_2 b_2 c_2 d_2 a_1 b_1 c_1 d_1 a_0 b_0 c_0 d_0$.

According to some embodiments, the generation or creation of the numeric representation comprises interleaving only the most significant bits of said plurality of bits.

In an embodiment, the numeric representation is created by arranging the bits in the following order: $a_7 a_6 a_5 a_4 a_3 a_2 a_1 a_0 a_7 b_7 c_7 d_7 b_6 c_6 d_6 b_5 c_5 d_5 b_4 c_4 d_4 b_3 c_3 d_3 b_2 c_2 d_2 b_1 c_1 d_1 b_0 c_0 d_0$.

In another embodiment, the generation of the numeric representation comprises interleaving only the two most significant bits of each property according to the following sequence of bits: $d_7 c_7 b_7 a_7 d_6 c_6 b_6 a_6 d_5 d_4 d_3 d_2 d_1 d_0 c_5 c_4 c_3 c_2 c_1 c_0 b_5 b_4 b_3 b_2 b_1 b_0 a_5 a_4 a_3 a_2 a_1 a_0$.

In still another embodiment, the generation of the numeric representation comprises interleaving only the two or three most significant bits of each property, etc. Due to variations in image quality of the fingerprint 10, contact pressure etc., it is in general reasonable to assume that the two least significant bits in each property is insignificant or at least of little significance. This means that the 8 bits of the numeric representation can be masked away. In an embodiment, the numeric representation may thus e.g. be generated by arranging the bits in the following order: $d_7 c_7 b_7 a_7 d_6 c_6 b_6 a_6 d_5 c_5 b_5 a_5 d_4 c_4 b_4 a_4 d_3 c_3 b_3 a_3 d_2 c_2 b_2 a_2$.

When creating the numeric representation, it should be understood that the aim is to make the numeric representation as unique as possible. Therefore some LSD's in the participating properties may be masked away since they may vary due to dirt, moisture etc. The released space may instead be used for adding significant bits from one or more property types. Another potential reason for masking away some LSD's in the participating properties is that an aim of embodiments of the present invention is to search for similar or look-a-like properties. Having this in mind, it should be realized that some LSD's in the participating properties are not relevant for achieving a good result.

In step 305, the numeric representation is used as a search argument when searching the database comprising data related to a plurality of fingerprints. Accordingly, the numbers representing properties in the unknown fingerprint 10 are used as binary search arguments for similar or look-a-like properties that are stored in the database. That is, the search for identical or similar fingerprints in step 305 comprises searching for corresponding properties in a database comprising data related to a plurality of fingerprints.

In an embodiment, the method further comprises, after the assigning in step 303, the further step of grouping a plurality of properties into a plurality of subsets of properties. In this embodiment, the step of generating, i.e. step 304, comprises generating a plurality of numeric representations of said fingerprint based on said subsets of properties. Furthermore, the step 305 comprises using the plurality of numeric representations as search arguments when searching the database.

As one illustrative example, the database comprising data related to a plurality of fingerprints may comprise a global table of numeric representations from previously stored fingerprints. Each element in the global table may comprise not only the numeric representation of the fingerprint, but also a numeric representation of the identity of the person from which the fingerprint originates. Said numeric representation of the identity, may be called owner's index.

In an embodiment, the search may result in a number of similar numeric representations, which may be stored in a temporary table T1. Sorting the table T1 on the owner's index and by counting the number a certain owner is found, a second table T2 may be created. Table T2 may thus comprise owner's index and the frequency count of properties for the owner. When sorted on frequency count in decreasing order T2 may comprise a list with the most likely owner first in the list.

With the aim of identifying the most likely owner found in T2, the owner's index is, in a first step, used to retrieve a fingerprint, or the representation thereof, for the most likely owner from a database. In a second step, a first plurality of numeric representations of the unknown fingerprint is generated using filter conditions. In a third step, a second plurality of numeric representations of the known fingerprint retrieved from the database is generated using the same or similar filter conditions as for the first plurality. In a fourth step, each numeric representation in the first set is compared to each numeric representation in the second plurality. If two representations are similar to each other, the representations may create a matching pair. When all representations in the two said pluralities have been compared, a plurality of matching pairs has been created.

In a fifth step, a rotation angle, for each said matching pair, is calculated. The rotation angle is represented by the angle between one line through two of the participating feature points in the first numeric representation, and the corresponding line in the second numeric representation in said matching pair. By calculating the rotation angles for all matching pairs, a plurality of rotation angles is created. In a sixth step, the frequency of all rotation angles +/− an allowed difference may be counted, and the most frequent rotation angle may be found and be compared to the frequency values of the remaining rotation angles. If the minimum frequency difference is below a threshold value, the fingerprints do not match. In a seventh step, for each feature point participating in each numeric representations in said plurality of matching numeric representations, the presence of the said feature point in the remaining numeric representations in said plurality of matching numeric representations, is tested. A plurality of matching feature points, PMF, is created, where PMF comprises all feature points participating in all numeric representations where said feature point is found. The number of matching feature points equals the number of unique feature points in PMF.

FIG. 4A shows an illustrative example of a table, which lists similar values derived from the properties with the assigned numbers 52, 49, 53. Upon reviewing the table shown in FIG. 4A, it should be understood that only one binary search is required, and a number of linear searches are enough to find all similar properties in the table. If the numbers A, B, C in the table represents the sides of a triangle, a person skilled in the art realizes that similar shaped triangles will be found in the vicinity of each other. However, the interleaving of digits does not always result in a list of consecutive values. FIG. 4B shows another list of properties where 2 binary searches are required to find the values concluded from similar triplets. More lists of properties can be created showing that more than 2 binary searches may be required. It has been found that, if the used binary digits of assigned number of each property varies +/−1, the number of binary searches required to find all similar shaped properties in the sorted global table may be reduced significantly compared to prior art solutions. This should be realized upon reviewing FIG. 4A and FIG. 4B, and comparing this to a SQL statement which may be used in prior art solutions. Such a SQL statement may have the following syntax:

SELECT*From GLOBALTABLE where A>ACONST−2 AND A<ACONST+2 AND B>BCONST−2 AND B<BCONST+2 AND C>CCONST−2 AND C<CCONST+2

Apparatus

Figure 5:
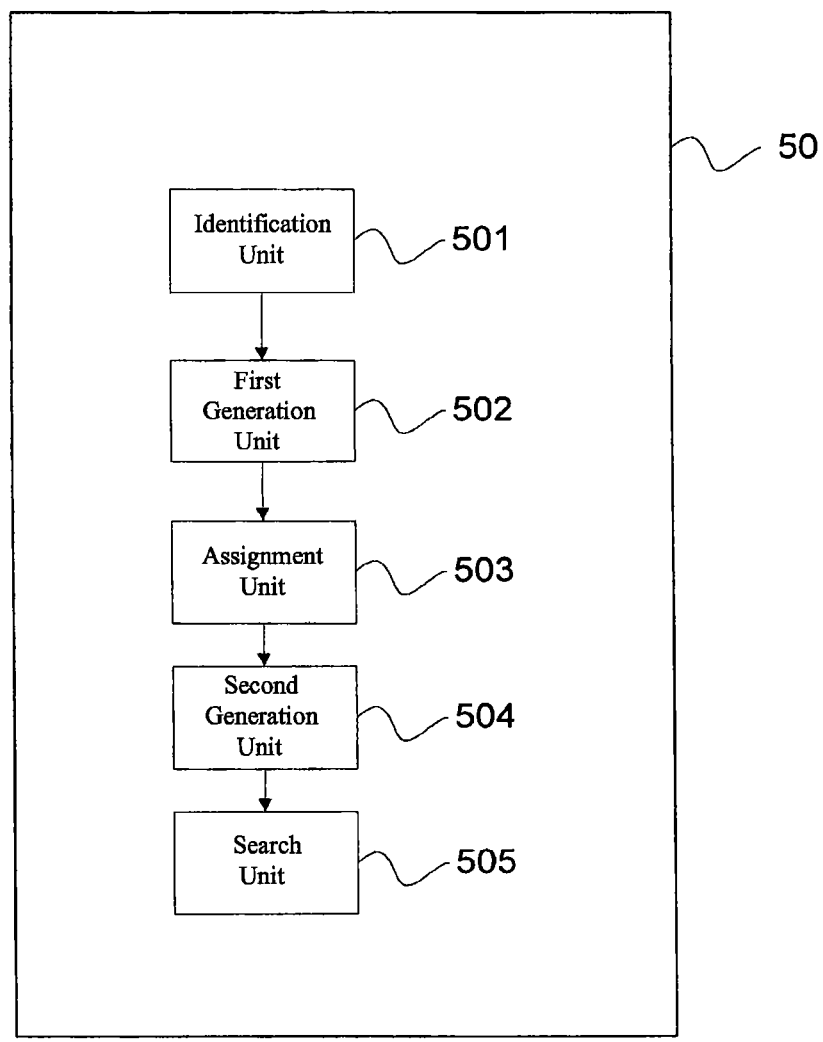
FIG. 5 is a block diagram of an apparatus according to an embodiment of the present invention.

In an embodiment according to FIG. 5, an apparatus 50 for searching a database comprising data related to a plurality of fingerprints, comprises:

an identification unit 501 adapted to identify at least two feature points in an image of an unknown fingerprint;

a first generation unit 502 adapted to generate a plurality of properties based on the at least two feature points;

an assignment unit 503 adapted to assign a number comprising a plurality of digits to each of the plurality of properties;

a second generation unit 504 adapted to generate a numeric representation of said fingerprint based on the assigned numbers; and a search unit 505 adapted to use the numeric representation as a search argument when searching the database.

The second generation unit 504 is adapted to generate said numeric representation by at least partly interleaving said plurality of digits.

The unit(s) of the apparatus 50 may e.g. be in hardware, such as e.g. a processor with a memory. The processor could be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

According to another embodiment, the apparatus 50 comprises unit(s) adapted to perform the method steps defined in any one of the embodiments.

In an embodiment, the apparatus 50 is used in a police control or in a crime scene investigation.

In another embodiment, the apparatus 50 is used in a passage system at an airport, industrial park or building, etc.

In still another embodiment, the apparatus 50 is used for authenticating a person to use a certain type of equipment. Examples of such equipment are automatic cash dispensers, access systems, systems of various types of electronic equipment, e.g. mobile telephones or computers.

Computer Program Product

Figure 6:
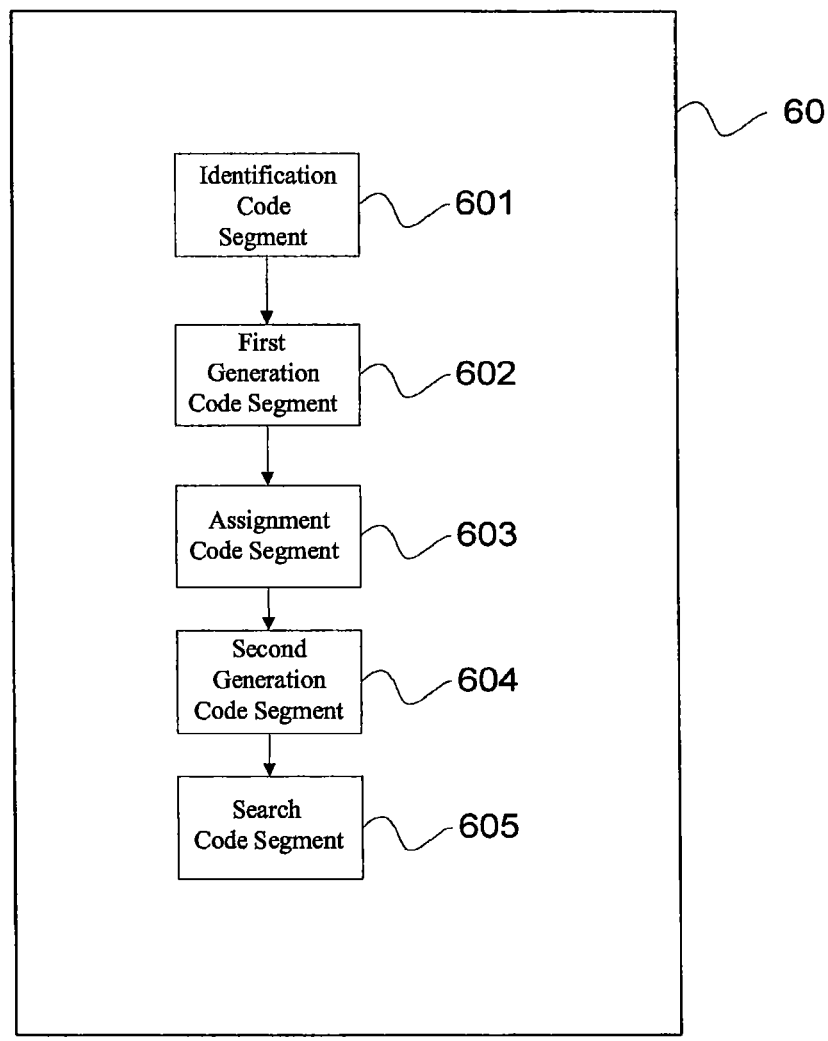
FIG. 6 is a block diagram of a computer program product according to an embodiment of the present invention.

In an embodiment according to FIG. 6, a computer program product 60 for searching a database comprising data related to a plurality of fingerprints, comprises:

an identification code segment 601 adapted to identify at least two feature points in an image of an unknown fingerprint;

a first generation code segment 602 adapted to generate a plurality of properties based on the at least two feature points;

an assignment code segment 603 adapted to assign a number comprising a plurality of digits to each of the plurality of properties;

a second generation code segment 604 adapted to generate a numeric representation of said fingerprint based on the assigned numbers; and a search code segment 605 adapted to use the numeric representation as a search argument when searching the database.

The second generation code segment 604 is adapted to generate said numeric representation by at least partly interleaving said plurality of digits. The computer program product may e.g. be embodied on a record medium, stored in a computer memory, embodied in a read-only memory, or carried on an electrical carrier signal.

According to another embodiment, the computer program product 60 for processing by a computer system comprises computer program code means for performing the method steps defined in any one of the embodiments.

The computer program product 60 may be loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

Some embodiments of the invention allow for improved speed of the search process when searching a database comprising data related to a plurality of fingerprints. It is an advantage of some embodiments of the invention that they allow for searching a database comprising data related to a plurality of fingerprints to find a match with improved performance.

The invention can be implemented in any suitable form including hardware, software, firmware or any combination of these. However, it may be advantageous to implement the invention as computer software running on one or more data processors and/or digital signal processors. The elements and components of the embodiments of the invention may be physically, functionally and logically implemented in any suitable way. Indeed, the functionality may be implemented in a single unit, in a plurality of units or as part of other functional units. As such, embodiments of the invention may be implemented in a single unit, or may be physically and functionally distributed between different units and processors. With reference to FIG. 5, the units 501, 502, 503, 504, 505 can, e.g., be implemented in one or more computers connected in a local or remote network. Examples of such networks include, but are not limited to, LAN, WAN, UMA, GAN, Bluetooth, etc. As an illustrative example, when using embodiments of the present invention in a police control application it may be advantageous to have unit 501 in local device, whereas at least unit 505 is implemented in a remote server.

Combinations and modifications of the above-mentioned embodiments should be able to be implemented by a person ordinary skilled in the art to which this invention belongs.

Applications and use of the above-described embodiments according to the invention are various and include all fields wherein fingerprint matching is used.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be emphasized that the singular forms "a", "an" and "the" as used herein are intended to comprise the plural forms as well, unless expressly stated otherwise. It will be further understood that the terms "includes/including" and/or "comprises/comprising" when used in this specification, is taken to specify the presence of stated features, integers, steps, operations, elements, and/or components, but do not preclude the presence or addition of one or more other features, integers, steps, operations, elements, components, and/or groups thereof.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. The different features and steps of the invention may be combined in other combinations than those described. The different embodiments described above do not limit the scope of the invention, but the scope of the invention is only limited by the appended patent claims.

What is claimed is:

1. An article of manufacture for searching a database comprising data related to a plurality of fingerprints, the article of manufacture comprising:

at least one non-transitory computer readable medium;

processor instructions contained on the at least one computer readable medium, the processor instructions configured to be readable from the at least one computer readable medium by at least one processor and thereby cause the at least one processor to operate as to perform the following steps:

identifying at least two minutiae points in an image of an unknown fingerprint;

generating a plurality of properties, wherein each property of the plurality of properties is based on a relation between the at least two minutiae points;

grouping the plurality of properties into a plurality of subsets of properties;

assigning a number comprising a plurality of digits to each of the plurality of properties wherein assigning comprises assigning a number comprising a plurality of bits to each of the plurality of properties;

generating a plurality of numeric representations of the unknown fingerprint based on the plurality of subsets of properties, each of the plurality of numeric representations is generated by at least partly interleaving the plurality of digits;

using the plurality of numeric representations as search arguments when searching the database; and wherein assigning comprises assigning a respective binary number $a_3 a_2 a_1 a_0, b_3 b_2 b_1 b_0, c_3 c_2 c_1 c_0, d_3 d_2 d_1 d_0 \ldots N_3 N_2 N_1 N_0$ to each of the plurality of properties, and generating comprises generating the numeric representation by arranging the plurality of bits in the following order: $N_3 \ldots d_3 c_3 b_3 a_3 N_2 \ldots d_2 c_2 b_2 a_2 N_1 \ldots d_1 c_1 b_1 a_1 N_0 \ldots d_0 c_0 b_0, a_0$.

2. The article of manufacture according to claim 1, wherein interleaving comprises interleaving the plurality of digits such that the plurality of digits of the numeric representation are arranged in an interleaved or intertwined manner.

3. The article of manufacture according to claim 1, wherein interleaving comprises interleaving most significant bits of the plurality of bits.

4. The article of manufacture according to claim 1, wherein interleaving comprises interleaving all bits of the plurality of bits.

5. The article of manufacture according to claim 1, wherein interleaving comprises interleaving the plurality of bits bitwise.

6. The article of manufacture according to claim 1, wherein interleaving comprises arranging the plurality of bits in order of significance, from most significant bits to least significant bits within a numeric representation.

7. The article of manufacture according to claim 1, further comprising:
    masking away at least some least significant bits of the plurality of bits.

8. The article of manufacture according to claim 1, wherein the method is used for at least one of a crime scene investigation, a police control, an authentication equipment or a passage system at an airport, industrial park or building.

9. An article of manufacture for searching a database comprising data related to a plurality of fingerprints, the article of manufacture comprising:
    at least one non-transitory computer readable medium;
    processor instructions contained on the at least one computer readable medium, the processor instructions configured to be readable from the at least one computer readable medium by at least one processor and thereby cause the at least one processor to operate as to perform the following steps:
    identifying at least two minutiae points in an image of an unknown fingerprint;
    generating a plurality of properties, wherein each property of the plurality of properties is based on a relation between the at least two minutiae points;
    grouping the plurality of properties into a plurality of subsets of properties;
    assigning a number comprising a plurality of digits to each of the plurality of properties wherein assigning comprises assigning a number comprising a plurality of bits to each of the plurality of properties;
    generating a plurality of numeric representations of the unknown fingerprint based on the plurality of subsets of properties, each of the plurality of numeric representations is generated by at least partly interleaving the plurality of digits;
    using the plurality of numeric representations as search arguments when searching the database; and
    wherein assigning comprises assigning a respective binary number $a_3 a_2 a_1 a_0, b_3 b_2 b_1 b_0, c_3 c_2 c_1 c_0, d_3 d_2 d_1 d_0 \ldots N_3 N_2 N_1 N_0$ to each of the plurality of properties, and generating comprises generating the numeric representation by arranging the plurality of bits in the following order: $a_3 b_3 c_3 d_3 \ldots N_3 a_2 b_2 c_2 d_2 \ldots N_2 a_1 b_1 c_1 \ldots N_1 a_0 b_0 c_0 d_0 \ldots N_0$.

10. An article of manufacture for searching a database comprising data related to a plurality of fingerprints, the article of manufacture comprising:
    at least one non-transitory computer readable medium;
    processor instructions contained on the at least one computer readable medium, the processor instructions configured to be readable from the at least one computer readable medium by at least one processor and thereby cause the at least one processor to operate as to perform the following steps:
    identifying at least two minutiae points in an image of an unknown fingerprint;
    generating a plurality of properties, wherein each property of the plurality of properties is based on a relation between the at least two minutiae points;
    grouping the plurality of properties into a plurality of subsets of properties;
    assigning a number comprising a plurality of digits to each of the plurality of properties wherein assigning comprises assigning a number comprising a plurality of bits to each of the plurality of properties;
    generating a plurality of numeric representations of the unknown fingerprint based on the plurality of subsets of properties, each of the plurality of numeric representations is generated by at least partly interleaving the plurality of digits;
    using the plurality of numeric representations as search arguments when searching the database; and
    wherein assigning comprises assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0, d_7 d_6 d_5 d_4 d_3 d_2 d_1 d_0 \ldots N_7 N_6 N_5 N_4 N_3 N_2 N_1 N_0$ to each of the plurality of properties, and generating comprises generating the numeric representation by arranging the plurality of bits in the following order: $N_7 \ldots d_7 c_7 b_7 a_7 N_6 \ldots d_6 c_6 b_6 a_6 N_5 \ldots d_5 c_5 b_5 a_5 N_4 \ldots d_4 c_4 b_4 a_4 N_3 \ldots d_3 c_3 b_3 a_3 N_2 \ldots d_2 c_2 b_2 a_2 N_1 \ldots d_0 c_1 b_1 a_1 N_0 \ldots d_0 c_0 b_0 a_0$.

11. An article of manufacture for searching a database comprising data related to a plurality of fingerprints, the article of manufacture comprising:
    at least one non-transitory computer readable medium;
    processor instructions contained on the at least one computer readable medium, the processor instructions configured to be readable from the at least one computer readable medium by at least one processor and thereby cause the at least one processor to operate as to perform the following steps:
    identifying at least two minutiae points in an image of an unknown fingerprint;
    generating a plurality of properties, wherein each property of the plurality of properties is based on a relation between the at least two minutiae points;
    grouping the plurality of properties into a plurality of subsets of properties;
    assigning a number comprising a plurality of digits to each of the plurality of properties wherein assigning comprises assigning a number comprising a plurality of bits to each of the plurality of properties;
    generating a plurality of numeric representations of the unknown fingerprint based on the plurality of subsets of properties, each of the plurality of numeric representations is generated by at least partly interleaving the plurality of digits;
    using the plurality of numeric representations as search arguments when searching the database; and
    wherein assigning comprises assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0, d_7 d_6 d_5 d_4 d_3 d_2 d_1 d_0 \ldots N_7 N_6 N_5 N_4 N_3 N_2 N_1 N_0$ to each of the plurality of properties, and generating comprises generating the numeric representation by arranging the plurality of bits in the following order: $a_7 b_7 c_7 d_7 \ldots N_7 a_6 b_6 c_6 d_6 \ldots N_6 a_5 b_5 c_5 d_5 \ldots N_5 a_4 b_4 c_4 d_4 \ldots N_4 a_3 b_3 c_3 d_3 \ldots N_3 a_2 b_2 c_2 d_2 \ldots N_2 a_1 b_1 c_1 d_1 \ldots N_1 a_0 b_0 c_0 d_0 \ldots N_0$.

12. An article of manufacture for searching a database comprising data related to a plurality of fingerprints, the article of manufacture comprising:
    at least one non-transitory computer readable medium;
    processor instructions contained on the at least one computer readable medium, the processor instructions configured to be readable from the at least one computer readable medium by at least one processor and thereby cause the at least one processor to operate as to perform the following steps:

identifying at least two minutiae points in an image of an unknown fingerprint;

generating a plurality of properties, wherein each property of the plurality of properties is based on a relation between the at least two minutiae points;

grouping the plurality of properties into a plurality of subsets of properties;

assigning a number comprising a plurality of digits to each of the plurality of properties wherein assigning comprises assigning a number comprising a plurality of bits to each of the plurality of properties;

generating a plurality of numeric representations of the unknown fingerprint based on the plurality of subsets of properties, each of the plurality of numeric representations is generated by at least partly interleaving the plurality of digits;

using the plurality of numeric representations as search arguments when searching the database; and wherein assigning comprises assigning a respective binary number $a_7 a_6 a_5 a_4 a_3 a_2 a_1 a_0, b_7 b_6 b_5 b_4 b_3 b_2 b_1 b_0, c_7 c_6 c_5 c_4 c_3 c_2 c_1 c_0, d_7 d_6 d_5 d_4 d_3 d_2 d_1 d_0 \ldots N_7 N_6 N_5 N_4 N_3 N_2 N_1 N_0$ to each of the plurality of properties, and generating comprises generating the numeric representation by arranging the plurality of bits in the following order: $a_7 a_6 a_5 a_4 a_3 a_2 a_1 a_0 a_7 b_7 c_7 d_7 \ldots N_7 b_6 c_6 d_6 \ldots N_6 b_5 c_5 d_5 \ldots N_5 b_4 c_4 d_4 \ldots N_4 b_3 c_3 d_3 \ldots N_3 b_2 c_2 d_2 \ldots N_2 b_1 c_1 d_1 \ldots N_1 b_0 c_0 d_0 \ldots N_0$.

* * * * *